United States Patent
Shapoury

(10) Patent No.: US 11,658,990 B2
(45) Date of Patent: May 23, 2023

(54) SYSTEMS AND METHODS FOR DETECTING CYBERSECURITY THREATS

(71) Applicant: THE BOEING COMPANY, Chicago, IL (US)

(72) Inventor: Alireza Shapoury, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 571 days.

(21) Appl. No.: 16/457,482

(22) Filed: Jun. 28, 2019

(65) Prior Publication Data

US 2020/0412752 A1 Dec. 31, 2020

(51) Int. Cl.
*H04L 9/40* (2022.01)
*G06F 30/00* (2020.01)
*H04L 67/12* (2022.01)

(52) U.S. Cl.
CPC .......... *H04L 63/1425* (2013.01); *G06F 30/00* (2020.01); *H04L 67/12* (2013.01)

(58) Field of Classification Search
USPC ......................................................... 726/23
See application file for complete search history.

(56) References Cited

U.S. PATENT DOCUMENTS

| | | | |
|---|---|---|---|
| 7,437,225 B1 | 10/2008 | Rathinam | |
| 7,480,546 B2 * | 1/2009 | Kamdar | G06F 40/58 701/1 |
| 7,715,819 B2 | 5/2010 | Rockwell | |
| 7,761,200 B2 | 7/2010 | Avery et al. | |
| 8,314,730 B1 | 11/2012 | Musiak et al. | |
| 8,340,854 B2 | 12/2012 | Small et al. | |
| 8,645,148 B2 | 2/2014 | Small et al. | |
| 8,694,196 B1 | 4/2014 | Doulatshahi et al. | |
| 9,100,361 B1 | 8/2015 | Lucchesi et al. | |

(Continued)

FOREIGN PATENT DOCUMENTS

| | | | | |
|---|---|---|---|---|
| EP | 2978187 A1 | 1/2016 | | |
| GB | 2562414 A | * 11/2018 | | ............... B61K 9/08 |
| WO | WO-2018125989 A2 | * 7/2018 | | ......... G06F 16/1824 |

OTHER PUBLICATIONS

EP Extended Search Report for related application 17183546.5 dated Sep. 7, 2017, 8 pp.

*Primary Examiner* — Sakinah White Taylor
(74) *Attorney, Agent, or Firm* — Armstrong Teasdale LLP

(57) ABSTRACT

A system for detecting anomalies is provided. The system includes a computer system including at least one processor in communication with at least one memory device. The computer system receives communications from a remote computer platform. The at least one processor is programmed to execute real-time a simulation model of the remote computer platform. The simulation model simulates inputs and outputs of the remote computer platform based on real-time data. The at least one processor is also programmed to receive one or more outbound communications transmitted from the remote computer platform, generate one or more outputs of the simulation model, compare the one or more outbound communications transmitted from the remote computer platform to the one or more outputs of the simulation model, detect one or more differences based on the comparison, and generate an output based on the one or more differences.

20 Claims, 8 Drawing Sheets

(56) References Cited

U.S. PATENT DOCUMENTS

| | | | |
|---|---|---|---|
| 9,369,484 | B1 | 6/2016 | Lacerte et al. |
| 9,798,329 | B2 | 10/2017 | Shattil |
| 10,250,619 | B1 | 4/2019 | Park et al. |
| 10,530,811 | B2* | 1/2020 | Black .................. H04L 63/0281 |
| 2007/0152849 | A1 | 7/2007 | McConnell et al. |
| 2009/0125169 | A1 | 5/2009 | Edwards et al. |
| 2009/0133112 | A1 | 5/2009 | Kauffman et al. |
| 2009/0201190 | A1 | 8/2009 | Huthoefer et al. |
| 2010/0167723 | A1 | 7/2010 | Soumier et al. |
| 2010/0175006 | A1 | 7/2010 | Li |
| 2010/0318794 | A1 | 12/2010 | Dierickx |
| 2011/0047230 | A1 | 2/2011 | McGee |
| 2012/0197896 | A1 | 8/2012 | Li et al. |
| 2014/0013431 | A1 | 1/2014 | Bush et al. |
| 2015/0215899 | A1 | 7/2015 | Kumar et al. |
| 2016/0142410 | A1* | 5/2016 | Mazzara, Jr. ......... H04W 12/08 726/4 |
| 2016/0249853 | A1* | 9/2016 | Ricci .................... B60W 50/14 340/870.07 |
| 2016/0057160 | A1 | 12/2016 | Buehler et al. |
| 2017/0082745 | A1 | 3/2017 | Kronfeld et al. |
| 2017/0183104 | A1 | 6/2017 | Colby |
| 2017/0235316 | A1 | 8/2017 | Shattil |
| 2018/0122506 | A1* | 5/2018 | Grantcharov ........ A61B 5/0022 |
| 2018/0124233 | A1* | 5/2018 | Abramson ............. H04W 4/48 |
| 2018/0159879 | A1* | 6/2018 | Mestha ................ G06N 3/0454 |
| 2019/0149565 | A1* | 5/2019 | Hagi ..................... G06N 5/022 726/23 |

* cited by examiner

SYSTEMS AND METHODS FOR DETECTING CYBERSECURITY THREATS

BACKGROUND

The field of the present disclosure relates generally to detecting to cybersecurity threats and, more specifically, to automatically detecting potential cybersecurity threats to a computer network using a virtual ecosystem in an aviation environment.

Aviation platforms and infrastructures consist of many complex, networked, and hierarchical systems that perform various aviation computing needs. Some aviation platforms, such as aircraft standalone systems are migrating to e-Enabled networked aerospace approaches for greater operational performance efficiencies. The adoption of e-Enabled architectures and technologies increases the operational and performance efficiencies that results from being networked. The e-Enabling of aircraft systems with aerospace-specific and commercial networking solutions, enables communication between systems and across aircraft systems domain boundaries.

However, the interconnection of aircraft systems domains and improved ability to communicate with on-board and off-board systems increases the risk of current and emerging cybersecurity attacks. In addition, detection of hidden thread and maligned (software/firmware) payloads is challenging in a network which serves several sensors, and actuators. Furthermore, aviation embedded systems and controllers may utilize General Purpose Computing (GPC) hardware and commercial software operating systems to reduce cost and provide added functionality. The use of GPC hardware and commercial software increases the risk of cybersecurity attacks that leverage existing vulnerabilities of the deployed software and hardware implementations. Hardware-based redundancy may reduce the risks of outages, but additional hardware is used very sparingly within aircraft due to weight issues, where every additional pound could cost tens of thousands of dollars in fuel expenses over time.

BRIEF DESCRIPTION

In one aspect, a system for detecting anomalies is provided. The system includes a computer system including at least one processor in communication with at least one memory device. The computer system receives communications from a remote computer platform. The at least one processor is programmed to execute a real-time simulation model of the remote computer platform. The simulation model simulates inputs and outputs of the remote computer platform based on real-time data. The at least one processor is also programmed to receive one or more outbound communications transmitted from the remote computer platform. The at least one processor is further programmed to generate one or more outputs of the simulation model. In addition, the at least one processor is programmed to compare the one or more outbound communications transmitted from the remote computer platform to the one or more outputs of the simulation model. Moreover, the at least one processor is programmed to detect one or more differences based on the comparison. Furthermore, the at least one processor is programmed to generate an output based on the one or more differences.

In another embodiment, a system for detecting anomalies is provided. The system includes a computer system including at least one processor in communication with at least one memory device. The computer system receives communications from a remote computer platform. The at least one processor is programmed to execute a real-time simulation model of the remote computer platform. The simulation model simulates inputs and outputs of the remote computer platform based on real-time data. The at least one processor is also programmed to receive a first data stream transmitted from the remote computer platform. The first data stream includes a plurality of communications based, at least in part, on measurements from one or more sensors associated with the remote computer platform. The one or more sensors measure environment conditions associated with the remote computer platform. The at least one processor is further programmed to receive a second data stream comprising one or more environmental conditions associated with the remote computer platform. In addition, the at least one processor is programmed to compare payload data from the first data stream with the one or more environmental conditions of the second data stream. Moreover, the at least one processor is programmed to detect one or more differences based on the comparison. Furthermore, the at least one processor is programmed to generate an output based on the one or more differences.

In yet another embodiment, a method for detecting anomalies in a remote computer platform is provided. The method is implemented on a computer system including at least one processor in communication with at least one memory device. The computer system receives communications from a remote computer platform. The method includes executing a real-time simulation model of the remote computer platform. The simulation model simulates inputs and outputs of the remote computer platform based on real-time data. The method also includes receiving one or more outbound communications transmitted from the remote computer platform. The one or more outbound communications based, at least in part, on measurements from one or more sensors associated with the remote computer platform. The one or more sensors measure environment conditions associated with the remote computer platform. The method also includes receiving environmental data associated with the remote computer platform. The method further includes comparing payload data from the one or more outbound communications with the environmental data. In addition, the method includes generating one or more outputs of the simulation model based, at least in part, on the environmental data. Moreover, the method includes comparing the one or more outbound communications transmitted from the remote computer platform to the one or more outputs of the simulation model. Furthermore, the method includes detecting one or more differences based on the two comparisons. The method includes generating an output based on the one or more differences.

DETAILED DESCRIPTION

Figure 1:
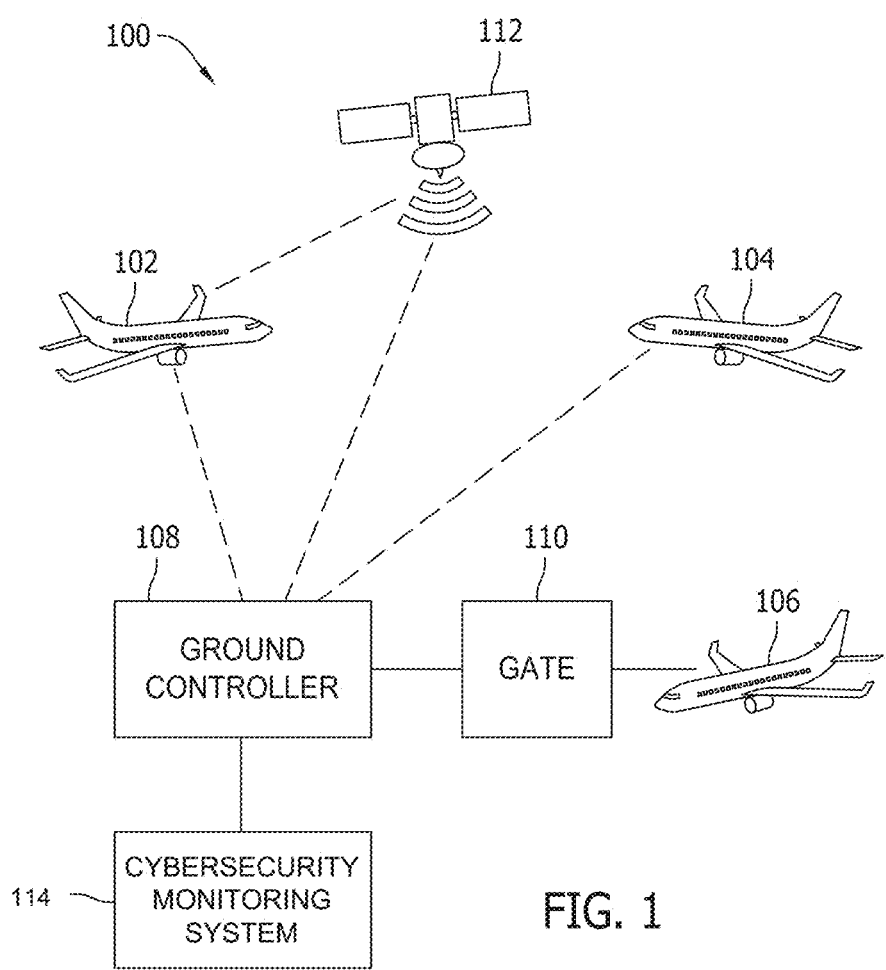
FIG. 1 illustrates a block diagram of an example overview of an aviation environment in accordance with one embodiment of the present disclosure.

The implementations described herein relate to systems and methods for monitoring for cybersecurity threats in remote computer systems and, more specifically, for automatically monitoring for and detecting cybersecurity threats to a computer network in an aviation environment. More specifically, a cybersecurity monitoring ("CSM") computer device monitoring for one or more computer systems or computer networks for cyber-security threats and attacks by executing a simulation model of the remote computer system to generate outputs and compare those outputs to the outputs of the remote computer system to detect if there are differences in the output of the remote computer system and the simulation model.

Described herein are computer systems such as the CSM computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, the term "cybersecurity threat" includes an unauthorized attempt to gain access to a computer network or system. Cybersecurity threats, also known as cyber-attacks or cyber-threats, attempt to breach computer systems by taking advantage of vulnerabilities in the computer systems. Some cybersecurity threats include attempts to damage or disrupt a computer network or system. These cybersecurity threats may include, but are not limited to, active intrusions, spy-ware, mal-ware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing the computer system or remotely via a communications network.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a block diagram of an example overview of an aviation environment 100 in accordance with one embodiment of the present disclosure. Aviation environment 100 includes a plurality of aircraft 102, 104, and 106, which are in communication with a ground controller 108. In the example embodiment, aircraft 102 and 104 are in flight and aircraft 106 is at a gate 110. In some embodiments, in-flight aircraft 102 and 104 communicate with ground controller 108 through a cellular connection. In other embodiments, aircraft 102 communicates with ground controller 108 through satellite 112. In the example embodiment, aircraft 106 communicates with ground controller 108 through gate 110. In some embodiments, the connection to gate 110 is via a wireless connection. In other embodiments, the connection is a direct wired connection between aircraft 106 and gate 110. Gate 110 then relays data between ground controller 108 and aircraft 106. Gate 110 may communicate with ground controller 108 through the Internet through many interfaces including, but not limited to, at least one of a network, such as the Internet, a LAN, a WAN, an integrated services digital network (ISDN), a dial-up-connection, a digital subscriber line (DSL), a cellular phone connection, a satellite connection, other wireless or microwave links, and a cable modem.

In the example embodiment, communication between gate 110 and aircraft 106 is more desirable for large exchanges of information than the communication between in-flight aircraft 102 and 104 and ground controller 108. In this embodiment, critical information is communicated while aircraft 102 and 104 are in-flight, while general information is communicated once the aircraft is connected to a low-cost connection on the ground, such as at gate 110. For example, communication at gate 110 may be less expensive than communication while aircraft 102 and 104 is in flight. Gate based communication may also have higher bandwidth, faster speed, improved clarity, and different security than in-flight communication. In addition, the attributes of the communication with in-flight aircraft 102 and 104 may change based on the location of the corresponding aircraft 102 and 104, the weather patterns, and other phenomena that can affect communication and data transfer.

In the example embodiment, the communications between aircraft 102, 104, and 106 and ground controller 108 are monitored by cybersecurity monitoring system 114 in real-time. In some embodiments, cybersecurity monitoring system 114 receives the communications directly from ground controller 108. In other embodiments, cybersecurity monitoring system 114 taps into the communications between the ground controller 108 and the aircraft 102, 104, and 106. In the example embodiments, cybersecurity monitoring system 114 includes a cybersecurity database that includes potential cybersecurity threats, attack paths, potential responses to those cybersecurity threats, configuration data about each aircraft 102, 104, and 106 in a fleet of aircraft, potential upgrades and modifications to software and hardware contained on each aircraft on the fleet, and information on past attacks on various aircraft. Cybersecurity monitoring system 114 is also configured to communicate with aircraft 102, 104, and 106 and ground controller 108 to transmit information about potential cybersecurity threats detected in aircraft 102, 104, and 106.

Figure 2:
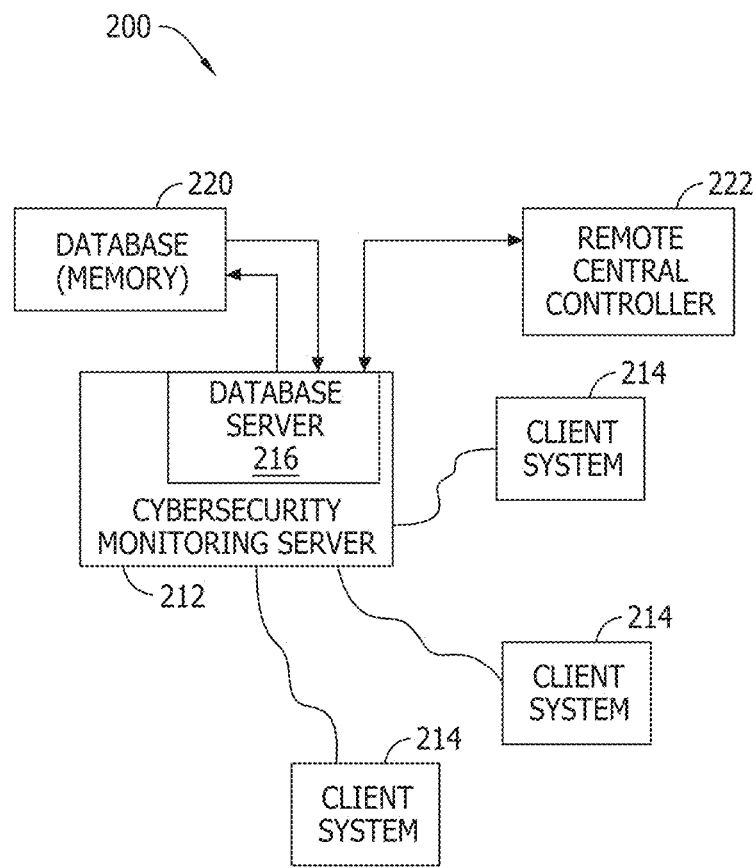
FIG. 2 is a simplified block diagram of an example system for analyzing for potential cybersecurity threats in remote computer devices, such as in the aviation environment shown in FIG. 1.

FIG. 2 is a simplified block diagram of an example system 200 for analyzing for potential cybersecurity threats in remote computer devices, such as in an aviation environment 100 shown in FIG. 1. In the example embodiment, system 200 is used for monitoring for one or more remote computer systems or computer networks for cyber-security threats and attacks, identifying detected cybersecurity threats and attacks, responding to the detected cybersecurity threats and attacks, and transmitting information about the detected cybersecurity threats and attacks to ground controller 108 (shown in FIG. 1). In addition, system 200 is a cyber-security management system that includes a cybersecurity monitoring (CSM) computer device 212 (also known as a CSM server) configured to monitor for and respond to cybersecurity threats. In the example embodiment, CSM server 212 is similar to cybersecurity monitoring system 114 (shown in FIG. 1).

As described below in more detail, CSM server 212 is programmed to monitor a plurality of remote computer system by executing simulations of those computer systems and comparing the output of the simulations to the outputs of the corresponding remote computer systems to detect potential differences in behavior. CSM server 212 is programmed to a) execute a simulation model of the remote computer platform, where the simulation model simulates inputs and outputs of the remote computer platform based on real-time data; b) receive one or more outbound communications transmitted from the remote computer platform; c) generate one or more outputs of the simulation model; d) compare the one or more outbound communications transmitted from the remote computer platform to the one or more outputs of the simulation model; e) detect one or more differences based on the comparison; and f) generate an output based on the one or more differences. In at least one embodiment, the CSM server 212 instructs the ground controller 108 to isolate potentially compromised remote systems.

In the example embodiment, client systems 214 are computers that include a web browser or a software application, which enables client systems 214 to communicate with CSM server 212 using the Internet, a local area network (LAN), or a wide area network (WAN). In some embodiments, client systems 214 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 214 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In some embodiments, client systems 214 are computer devices that control the operation of aircraft 102, 104, and 106 (shown in FIG. 1).

In some embodiments, client systems 214 are known as line replaceable units (LRU). These client systems 214 include, but are not limited to, flight deck controls (Electronic Flight Bag), avionics data (satellite communication (SATCOM), Aircraft Communications Addressing and Reporting System (ACARS), and avionics), open networking (avionics interfaces, servers, terminal wireless, network appliances, and core network), maintenance (software loading and maintenance access), cabin and airline Services (Flight Operational Quality Assurance (FOQA) Data, FA terminals and crew wireless), Network File Servers (NFS), Mass Storage Devices (MSDs), Crew Wireless LAN Units (CWLUs), and Passengers (in-flight entertainment (IFE), Wi-Fi, and cell phones). In the example embodiment, CSM server 212 is located on the ground and is able to view the communications to and from an aircraft, such as aircraft 102. In some embodiments, CSM server 212 is decentralized and composed of a plurality of computer devices which work together as described herein.

A database server 216 is communicatively coupled to a database 220 that stores data. In one embodiment, database 220 is a cybersecurity database that includes remote computer device configurations, cybersecurity threats, attack paths, responses to the cybersecurity threats, and remote computer device models. In the example embodiment, database 220 is stored remotely from CSM server 212. In some embodiments, database 220 is decentralized. In the example embodiment, a person can access database 220 via client systems 214 or a remote central controller 222 by logging onto CSM server 212.

CSM server 212 is also in communication with remote central controller 222. In some embodiments, remote central controller 222 is ground controller 108, shown in FIG. 1. Remote central controller 222 is configured to communicate with CSM server 212 via cellular communication, satellite communication, the Internet, or a Wide Area Network (WLAN). In the example embodiment, remote central controller 222 includes a cybersecurity database similar to database 220 which includes information similar to database 220. In the example embodiment, remote central controller 222 is configured to receive information about cybersecurity threats detected by CSM server 212, provide access to communications between remote central controller 222 and client systems 214, provide database updates to CSM server 212 in regards to cybersecurity threats, provide updates about the configuration of specific client systems 214, provide information about the conditions (such as, but not limited to, weather conditions) surrounds client systems 214, and receive and store forensic evidence about cybersecurity threats for future use. In some embodiments, remote central controller 222 is in communication with a plurality of CSM servers 212. In the example embodiment, remote central controller 222 is associated with the plurality of aircraft. For example, remote central controller 222 is associated with the airline associated with the plurality of aircraft. In other embodiments, remote central controller 222 is just in communication with the plurality of aircraft. In other embodiments, CSM server 212 is not associated with an aircraft, but instead associated with any computer network of networked client systems that operate as described herein.

Figure 3:
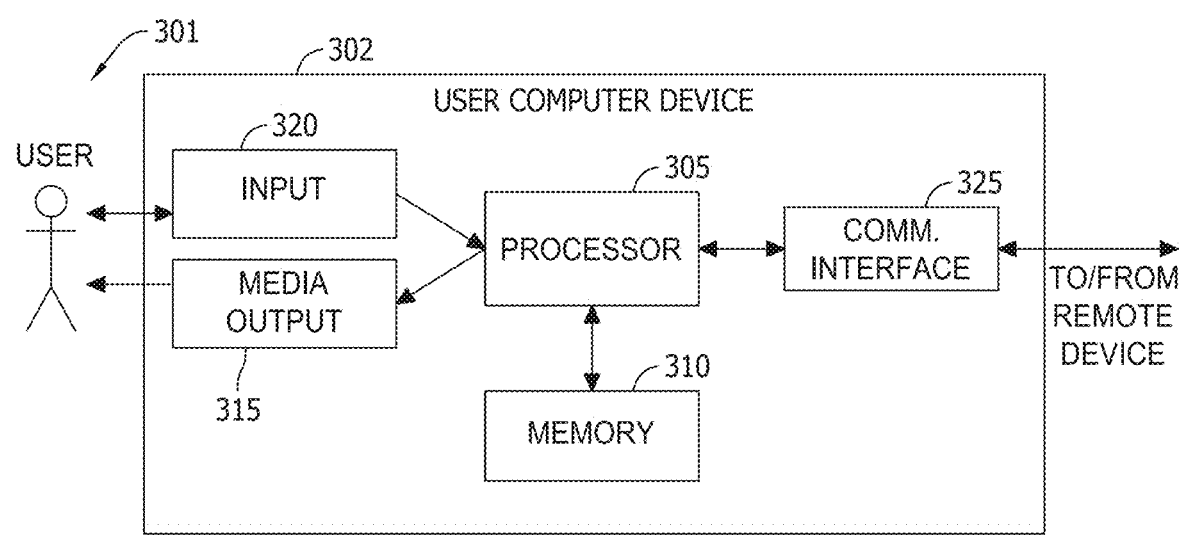
FIG. 3 illustrates an example configuration of a client computer device shown in FIG. 2, in accordance with one embodiment of the present disclosure.

FIG. 3 illustrates an example configuration of client system 214 shown in FIG. 2, in accordance with one embodiment of the present disclosure. User computer device 302 is operated by a user 301. User computer device 302 may include, but is not limited to, client systems 214 (shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an interface for viewing the status of one or more remote computer systems. In some embodiments, user computer device 302 includes an input device 320 for receiving input from user 301. User 301 may use input device 320 to, without limitation, select a remote computer system to view the status of Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as CSM server 212 (shown in FIG. 2). Communication interface 325 may also be in communication with a control system (not shown) of an aircraft, such as aircraft 102 shown in FIG. 1, where user computer device 302 provides instructions to and receives data from the control system. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from CSM server 212. A client application allows user 301 to interact with, for example, CSM server 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
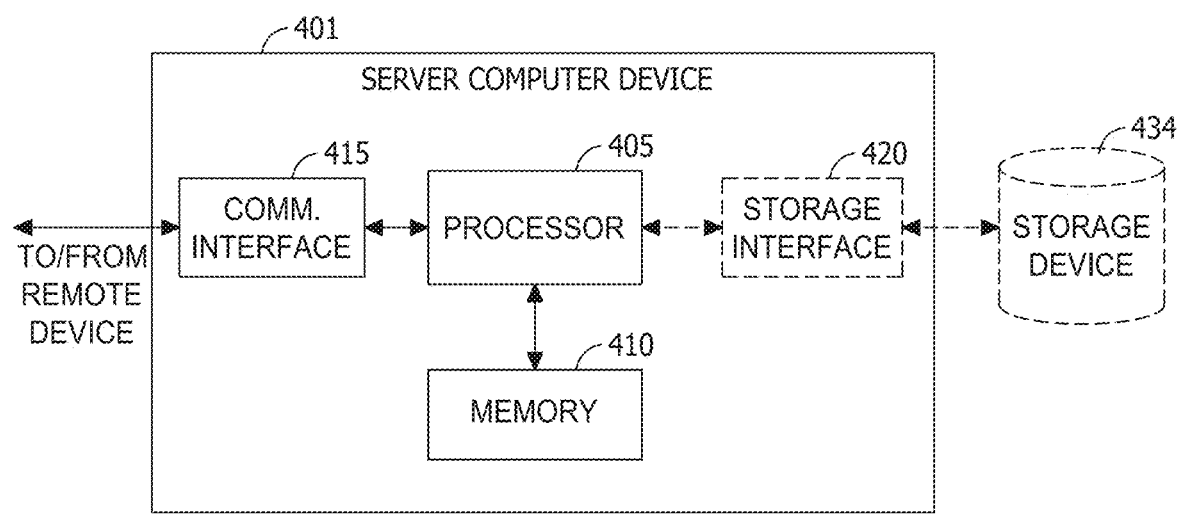
FIG. 4 illustrates an example configuration of the server system shown in FIG. 2, in accordance with one embodiment of the present disclosure.

FIG. 4 illustrates an example configuration of the server system 212 shown in FIG. 2, in accordance with one embodiment of the present disclosure. Server computer device 401 may include, but is not limited to, ground controller 108, cybersecurity monitoring system 114 (both shown in FIG. 1), database server 216, CSM server 212, and remote central controller 222 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, another CSM server 212, remote central controller 222, or client system 214 (shown in FIG. 2). For example, communication interface 415 may receive requests from remote central controller 222 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220

(shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 8:
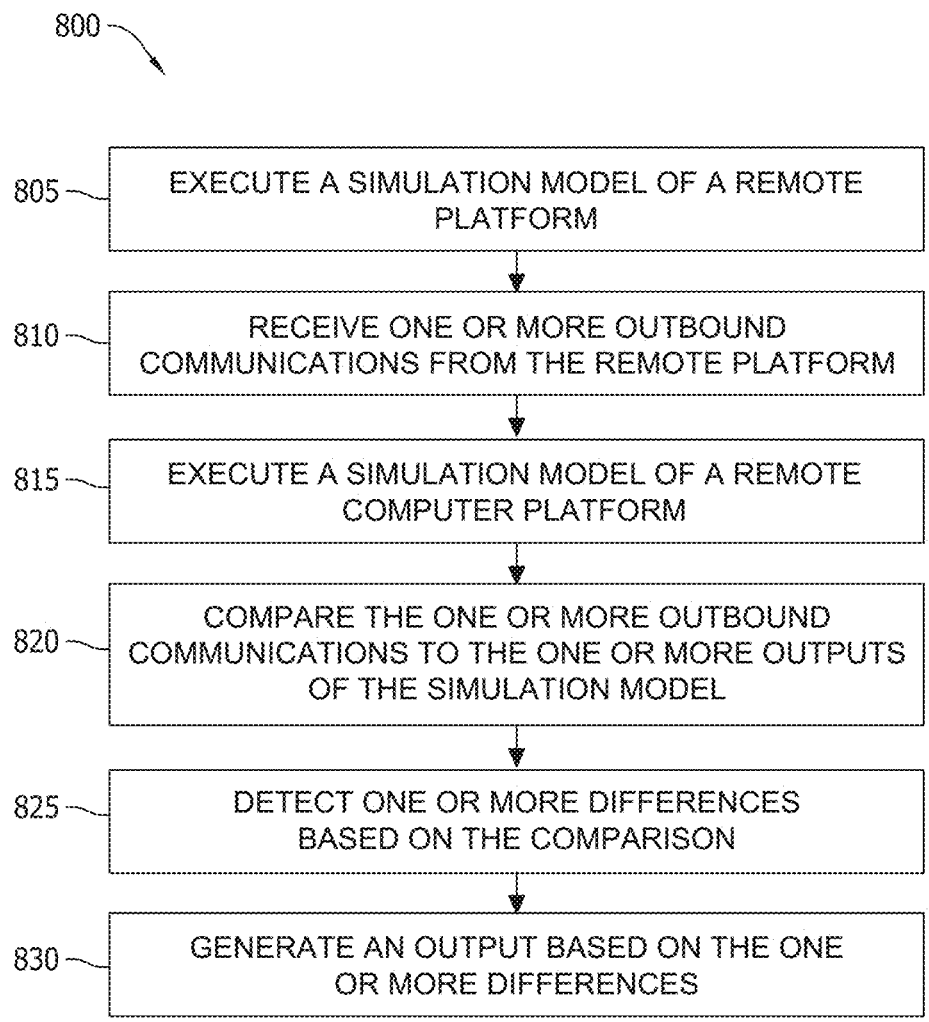
FIG. 8 is a flowchart illustrating an example of a process of monitoring for potential cybersecurity threats using the digital twin system shown in FIG. 5, in accordance with one embodiment of the disclosure.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instruction such as illustrated in FIG. 8.

Figure 5:
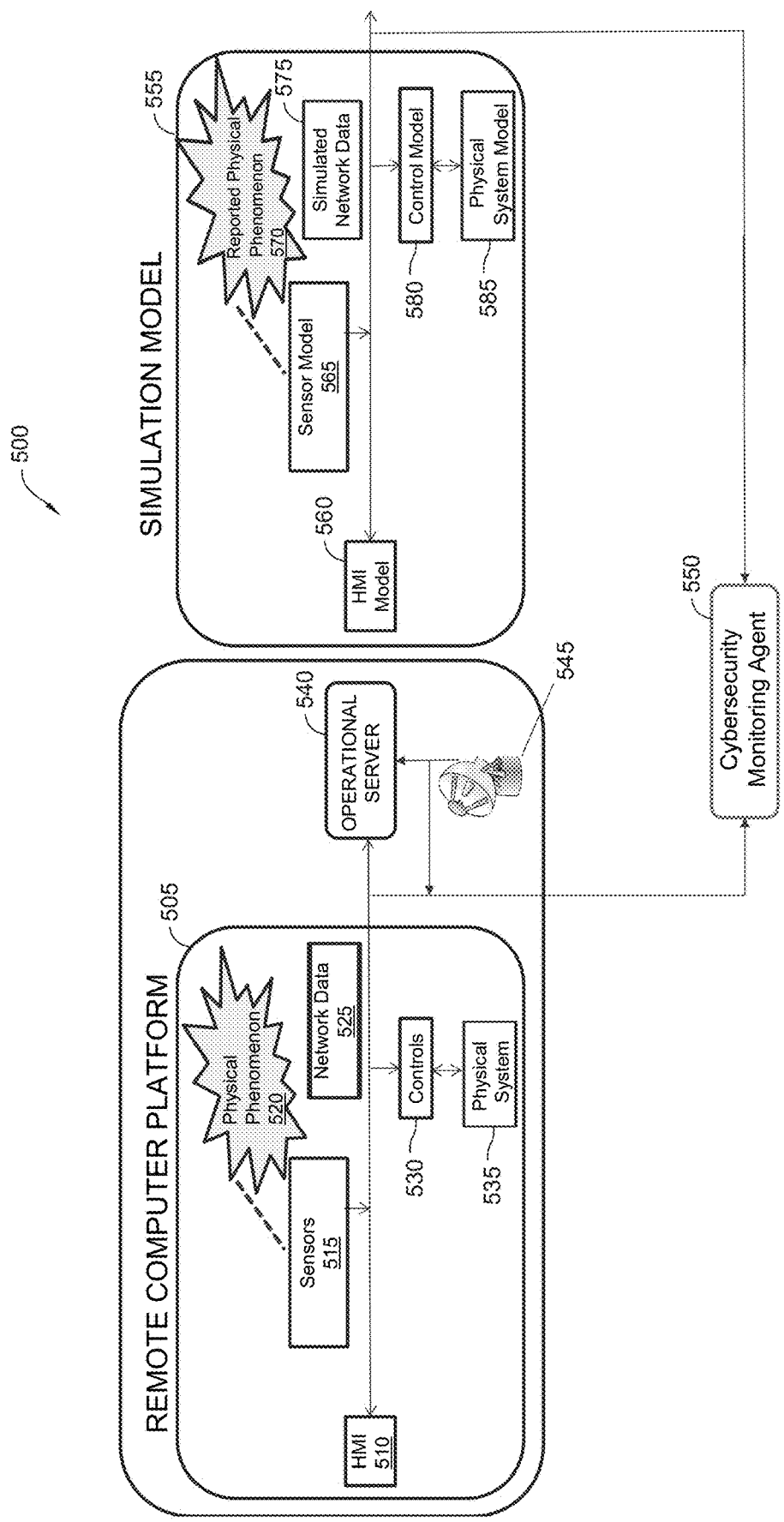
FIG. 5 is a simplified block diagram of a digital twin system using the system shown in FIG. 2.

FIG. 5 is a simplified block diagram of a digital twin system 500 using the system 200 (shown in FIG. 2). In the example embodiment, a remote computer platform (or remote controller) 505 is simulated via a simulation model 555. For the purposes of this discussion, remote computer platform 505 is described as being aboard an aircraft 102 (shown in FIG. 1). In other embodiments, remote computer platform 505 is any computer device or computer network that is in remote communication which includes a plurality of sensors that may be simulated. This may include, but is not limited to, a watercraft, such as a boat, barge, or ship; a wheeled vehicle, for example, but not limited to a car, a recreational vehicle (RV), or a train; and a space vehicle, such as a satellite, a space station, and a space vessel (manned or unmanned). In the exemplary embodiment, the simulation model 555 is a data recipient model and has a one-way, receive only, connection to the remote computer platform 555.

In the example embodiment, the remote computer platform 505 includes a human machine interface (HMI) 510 for receiving commands from and providing information to users, such as the crew of the aircraft 102. The remote computer platform 505 also receives information from a plurality of sensors 515 that provide data about physical phenomenon 520. Examples of physical phenomenon 520 could include any data measured by one or more sensors 515, such as, but not limited to, airspeed, air temperature, air pressure, altitude, and any other measured physical phenomenon 520. The remote computer platform 505 also includes information from controls 530 that are affected by the physical system 535 of the aircraft 102. These may include for example different control surfaces of the aircraft and/or engine settings or output. The remote computer platform 505 generates and receives network data 525 communicated to and from one or more ground based operational servers 540. In the example embodiment, operational server 540 may be similar to ground controller 108 (shown in FIG. 1) and remote central controller 222 (shown in FIG. 2). The operational server 540 may also be in communication with one or more other data sources 545, such as primary and secondary radars. In the example embodiment, the remote computer platform 505 receives data from the HMI 510, sensors 515, controls 530, and the operational server 540. The remote computer platform 505 generates network data 525 to transmit to the operational server 540 based on the received data.

The simulation model 555 (also known as a virtual ecosystem) is programmed to simulate the remote computer platform 505. The simulation model 555 includes an HMI model 560 to model the human machine interface 510 aboard the aircraft 102. The simulation model 555 also includes a sensor model 565 that is programmed to model the output of the sensors 515 based on the reported physical phenomenon 570. For example, if the aircraft 102 is flying at a specific altitude, the sensor model 565 simulates the readings of the sensors 515 for that altitude, such as air temperature and air pressure. A physical system model 585 which uses physics to model the physical systems 535 of the aircraft 102 and how they interact with the controls 530, as shown in the control model 580. The simulation model 555 uses these models to generate simulated network data 575 based on the output of the models.

A cybersecurity monitoring agent 550, which may be a part of the cybersecurity monitoring system 114 (shown in FIG. 1) or CSM server 212 (shown in FIG. 2), receives the network data 525 from the remote computer platform 505 and the simulated network data 575 from the simulation model 555. The cybersecurity monitoring agent 550 compares the network data 525 to the simulated network data 575 to detect differences. For example, these differences may be differences in messages based on the output of the sensors or based on differences in latency, data rate or data update frequency, or response times in the messages between the network data 525 and the simulated network data 575.

In the example embodiment, the simulation model 555 is programmed to closely model that exact remote computer platform 505. Based on the information measured at the sensors 515 and received from the operational server 540, the simulation model 555 is programmed to output the messages that would be output by the remote computer platform 505 including the same content and at the same time. The comparison, which is performed in real-time, by the cybersecurity monitoring agent 550 is to determine if the messages from the remote computer platform 505 are not as expected. For example, if remote computer platform 505 has been compromised by a cybersecurity threat such as a zero-day vulnerability, then the messages may have additional latency (1 ms vs. 500 ms) or increased memory usage or response times as the cybersecurity threat is using the processing power of the remote computer platform 505. Furthermore, the content of the messages may change, such as having the message size change, changes in the frequency of a digital handshake, having the data values change, or any other modification of the messages that may deviate from the expected messages provided by the simulation model 555.

To ensure that the simulation model 555 is an accurate representation of remote control platform 505, the simulation model 555 receives real-time data about the reported physical phenomenon 570, such as from the other sources 545 and operational server 540. In some embodiments, the simulation model 555 is also updated by communicating directly with the remote control platform 505, such as when the aircraft 102 is at a gate 110 (shown in FIG. 1). In the example embodiment, simulation model 555 is updated every time there is a change to remote control platform 505 or aircraft 102, such as when maintenance is performed, when devices within the aircraft 102 are replaced, or when software is updated to keep simulation model 555 to be an accurate and update to date simulation of remote control platform 505.

In the example embodiment, aircraft 102 with remote control platform 505 begins to travel from location A to location B. Simulation model 555 begins to simulate remote control platform 505 traveling from location A to location B. Simulation model 555 receives the network data 525 being transmitted between remote control platform 505 and operational server 540. Simulation model 555 also receives other information from the other data sources 545. In other embodiments, the data sources 545 may be synthesized with a simulation model. Cybersecurity monitoring agent 550 taps into the network data 525 between remote control platform 505 and operational server 540. Cybersecurity monitoring agent 550 also receives the simulated network data 575 from the simulation model 555 and compares the two data streams to determine whether there are any significant differences or deviations. These differences could signify a potential cybersecurity threat or a failure with one or more of the sensors.

In some embodiments, the cybersecurity monitoring agent 550 reports the differences to the operational server 540. In some embodiments, the operational server 540 generates a work order to check for a potentially malfunctioning sensor. In other embodiments, the operational server 540 isolates the network data 525 being received from the remote computer platform 505 to prevent the spread of a potential cybersecurity threat. In still other embodiments, the operational server 540 instructs the remote computer platform 505 to ignore the output of the potentially failing sensor and instead rely on other sensors. In further embodiments, the operational server 540 takes other mitigation actions in response to either a failing sensor or potential cybersecurity threat. In further embodiments, the behavior of operational server 540 may be modelled and integrated in the simulation model 555.

In some embodiments, the comparison is performed using algorithms, such as, but not limited to, stroboscopic/pairwise comparison, epoch-based time-varying analysis of data streams, spectral analysis based on Fourier or Wavelet transforms, empirical mode decomposition (EMD), machine learning, and extreme value theory (EVT), which may be applied to determine extreme values in a distribution function. The algorithm may be used to forecast one or more boundaries for the remote control platform's typical behavior. For example, a sliding window may be used to test for anomalous series within a newly arrived collection of data series. The cybersecurity monitoring agent 550 may use the time series features as inputs. Then the cybersecurity monitoring agent 550 may use a density-based comparison to detect any significant changes in the distribution of those selected features. The cybersecurity monitoring agent 550 may use data from both the ground-based operational server 540 and the simulation model 555. The cybersecurity monitoring agent 550 also accounts for the linearity and nonlinearity of the underlying data and also for stationary and non-stationary noise, such as by quantifying the noise to provide error margins and thresholds.

In some embodiments, the cybersecurity monitoring agent 550 performs parity and sanity checks to ensure that the remote computer platform 505 and the simulation model 555 are in sync. These checks and others may be prioritized, throttled, and performed based on available bandwidth. In some embodiments, this synchronization may be performed when the aircraft is a jet bridge or gate 110.

Figure 6:
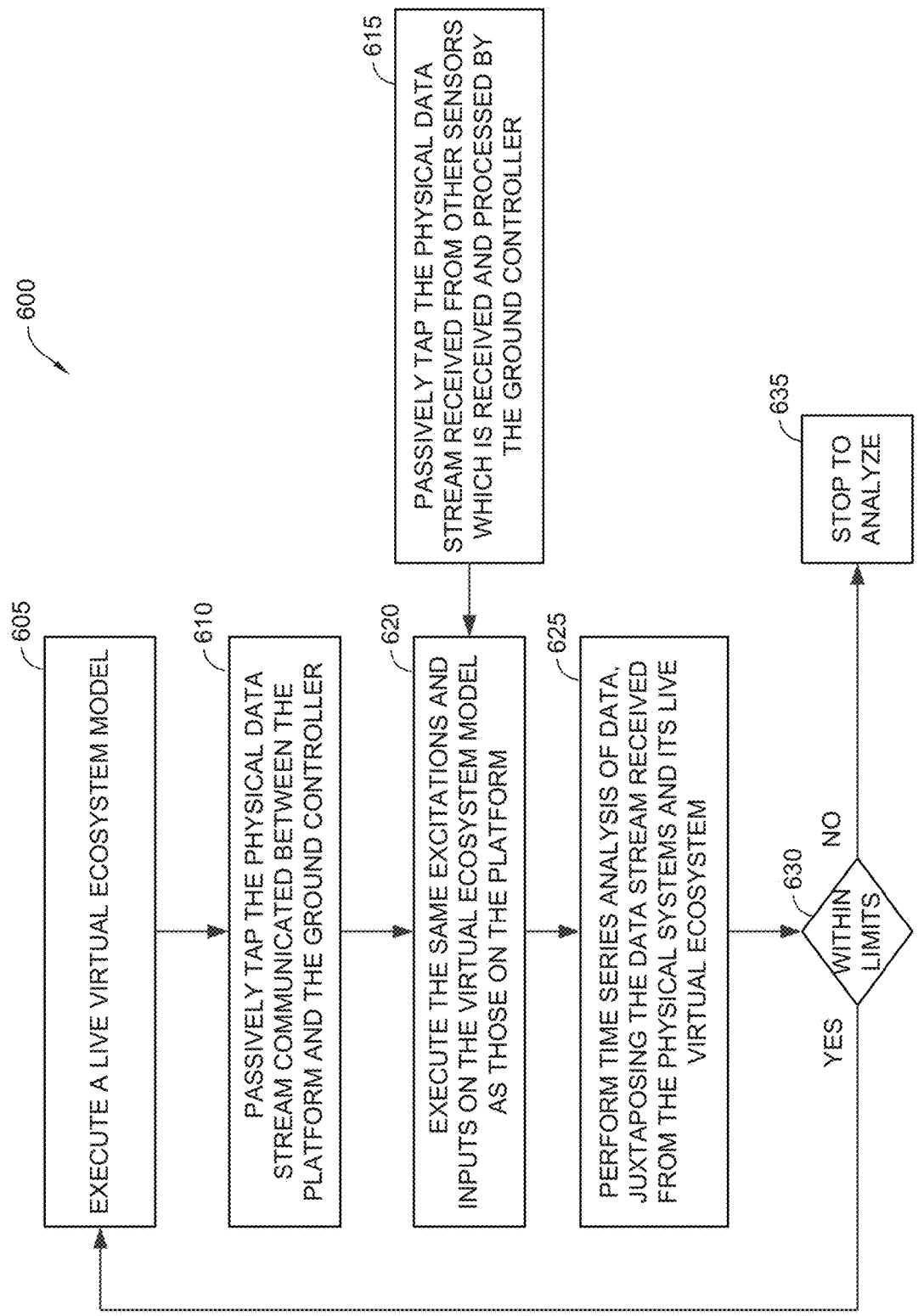
FIG. 6 is a flowchart of a process for univariate analysis of data streams using the digital twin system shown in FIG. 5.

FIG. 6 is a flowchart of a process 600 for univariate analysis of data streams using the digital twin system 500 shown in FIG. 5. In the example embodiment, process 600 is performed by a cybersecurity monitoring agent 550 (shown in FIG. 5) executing on one of the cybersecurity monitoring system 114 (shown in FIG. 1) and the CSM server 212 (shown in FIG. 2).

In the example embodiment, the CSM server 212 executes 605 a live virtual ecosystem model, such as simulation model 555 (shown in FIG. 5). The simulation model 555 is executed in real-time along with the remote computer platform 505 (shown in FIG. 5) that is being monitored.

The CSM server 212 passively taps 610 the data stream communicated between the remote computer platform 505 and the ground controller 108 (shown in FIG. 8). The passive tap is to ensure that the CSM server 212 does not affect or influence the communications between the remote computer platform 505 and the ground controller 108. The CSM server 212 also passively taps 615 the data stream received from other sensors, which is being received and processed by the ground controller 108. The data stream from the other sensors may include data from the other data sources 545 (shown in FIG. 5).

The CSM server 212 executes 620 the same excitations and inputs on the virtual ecosystem model 555 as those being applied to the remote computer platform 505. These excitations and inputs are based on the data streams that the CSM server 212 is passively tapping 610 and 615. Based on those excitations and inputs, the virtual ecosystem model 555 provides a plurality of outputs. The CSM server 212 performs 625 a time series analysis of the data. The CSM server 212 juxtaposes the received data streams with the live virtual ecosystem 555. The CSM server 212 determines 630 whether or not the results of the analysis of the data is within limits. If the results are within limits, then the CSM server 212 continues process 600 in real-time. If the results are not within limits, then the CSM server 212 may stop 635 process 600 to analyze.

The univariate time series analysis of the data streams blindly compares the data generated by the remote computer platform 505 and the virtual ecosystem 555. The CSM server 212 detects when there are differences in the size and the latency of the data stream provided by the remote computer platform 505, as this may be indicative of a malicious payload or cybersecurity threat.

Figure 7:
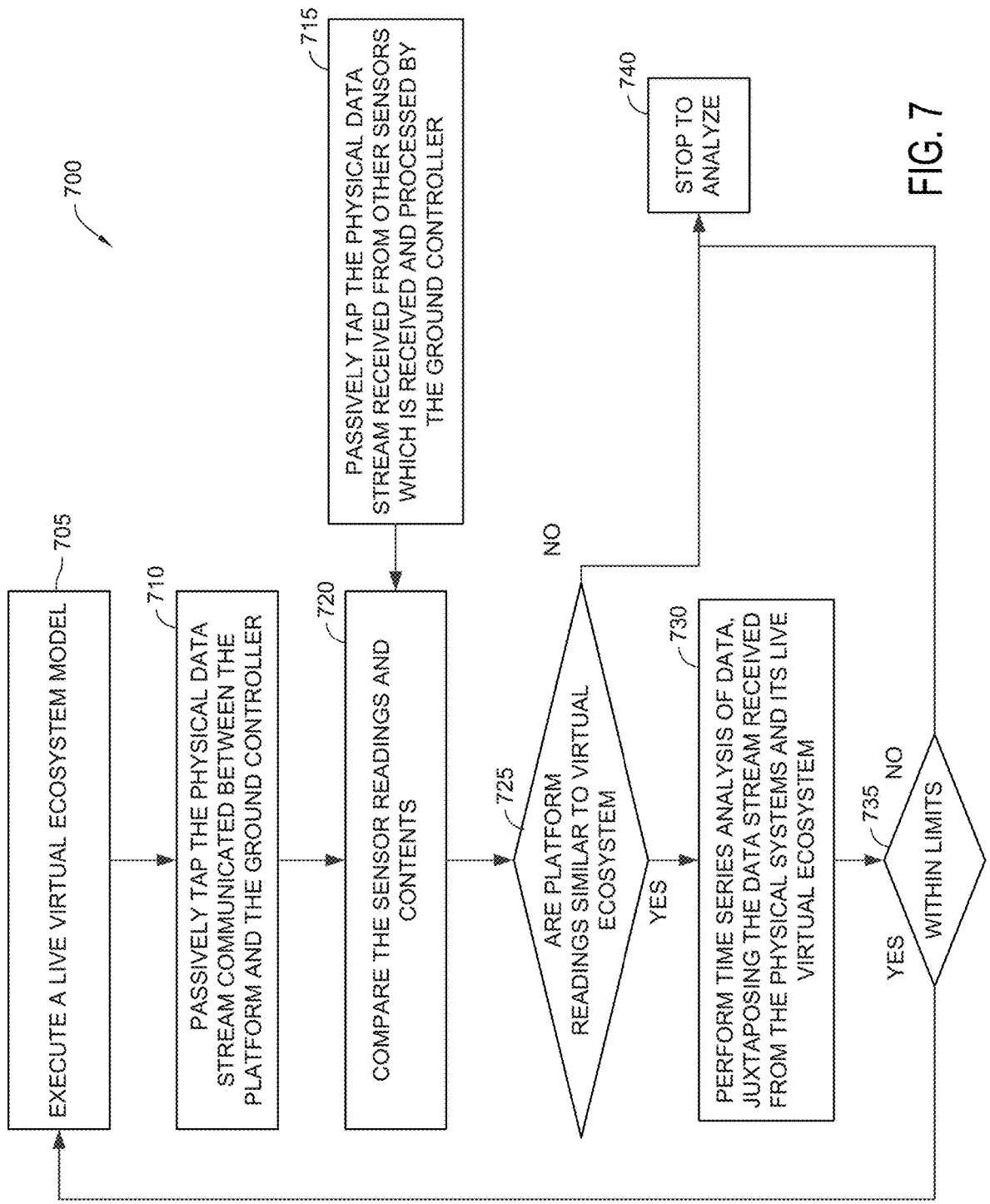
FIG. 7 is a flowchart of a process for multivariate analysis of data streams using the digital twin system shown in FIG. 5.

FIG. 7 is a flowchart of a process 700 for multivariate analysis of data streams using the digital twin system 500 (shown in FIG. 5). In the example embodiment, process 700 is performed by a cybersecurity monitoring agent 550 (shown in FIG. 5) executing on one of the cybersecurity monitoring system 114 (shown in FIG. 1) and the CSM server 212 (shown in FIG. 2).

In the example embodiment, the CSM server 212 executes 705 a live virtual ecosystem model, such as simulation model 555 (shown in FIG. 5). The simulation model 555 is executed in real-time along with the remote computer platform 505 (shown in FIG. 5) that is being monitored.

The CSM server 212 passively taps 710 the data stream communicated between the remote computer platform 505 and the ground controller 108 (shown in FIG. 8). The passive tap is to ensure that the CSM server 212 does not affect or influence the communications between the remote computer platform 505 and the ground controller 108. The CSM server 212 also passively taps 715 the data stream received from other sensors, which is being received and processed by the ground controller 108. The data stream from the other sensors may include data from the other data sources 545 (shown in FIG. 5).

The CSM server 212 compares 720 the sensor readings from the other data sources 545 and contents of the messages provided by the remote computer platform 505. The CSM server 212 determines 725 if the remote computer platform 505 readings are similar to those of the virtual ecosystem 555. If not, then the CSM server 212 stops 740 process 700 to analyze further. Otherwise, the CSM server 212 executes the same excitations and inputs on the virtual ecosystem model 555 as those being applied to the remote computer platform 505. These excitations and inputs are based on the data streams that the CSM server 212 is passively tapping 610 and 615. Based on those excitations and inputs, the virtual ecosystem model 555 provides a plurality of outputs.

Based on those outputs, the CSM server 212 performs 730 a time series analysis of the data. The CSM server 212 juxtaposes the received data streams with the live virtual ecosystem 555. The CSM server 212 determines 735 whether or not the results of the analysis of the data is within limits. If the results are within limits, then the CSM server 212 continues process 700 in real-time. If the results are not within limits, then the CSM server 212 may stop 740 process 700 to analyze.

The CSM server 212 performs the multivariate time series analysis of the data. In this analysis, some of the sensor data is extracted from the data streams and compared. This occurs while the original data stream from the remote computer platform 505 is being recorded. During maintenance and normal operation, the CSM server 212 compares the sensor data from the two streams and where they are similar, categorizes them as normal. Since the sensor data is similar, the CSM server 212 expects the data streams to be identical, such as in data stream size, message size, and latency. If there are unexplained repetitions or excessive delays, that may be an indication of hidden data transmissions or sensor load due to hosting a malicious payload or cybersecurity threat.

In addition to the methods described above, in some embodiments, the CSM server 212 uses Markov Models for the time series analysis. In this situations, the states correspond to the platform data. First an observation is made. Then when there is sufficient bandwidth, such as when the aircraft 102 is at a gate 110 or jet bridge, the CSM server 212 retrieves the current state of the remote computer platform 505. If no problems are detected, the CSM server 212 synchronizes the simulation model 555 with the remote computer platform 505. In addition, when the remote computer platform 505 is bounded by limited observation and bandwidth, the CSM server 212 uses the Hidden Markov Model process to probabilistically estimate what is unknown in the data stream and perform epoch-based threat detection. In some embodiments, the frobenious norm (squared error) may be used to serve as the measure of anomaly at each epoch. In some approaches, support vector machines may be used to blindly compare data streams of similar systems and determine error. In further embodiments, multidimensional empirical mode decomposition (EMD) on linear or nonlinear data can be performed when statistical properties of data are unknown and do not warrant statistical based analysis. Measurements of errors, symptoms, and records of data deviations between the physical system and the live virtual system can be used for mitigation and recovery.

FIG. 8 is a flowchart illustrating an example of a process of 800 monitoring for potential cybersecurity threats using the digital twin system 500 (shown in FIG. 5), in accordance with one embodiment of the disclosure. Process 800 may be implemented by a computing device, for example the CSM server 212 (shown in FIG. 2).

In the example embodiment, the CSM server 212 executes 805 a simulation model 555 of the remote computer platform 505 (both shown in FIG. 5). The simulation model 555 simulates inputs and outputs of the remote computer platform 505 based on real-time data. The CSM server 212 receives 810 one or more outbound communications transmitted from the remote computer platform 505, such as those to the operational server 540 (shown in FIG. 5).

The CSM server 212 generates 815 one or more outputs of the simulation model 555. The CSM server 212 compares 820 the one or more outbound communications transmitted from the remote computer platform 505 to the one or more outputs of the simulation model 555.

In the example embodiment, the CSM server 212 detects 825 one or more differences based on the comparison 820. In some embodiments, the CSM server 212 detects 825 the one or more differences based on at least one of message size, data handshaking rate or frequency, and transmission delay associated with the one or more outbound communications. In some other embodiments, the CSM server 212 detects the one or more differences based on a time series analysis of data contained in the one or more outbound communications and the one or more outputs of the simulation model 555.

The CSM server 212 generates 830 an output based on the one or more differences, that is output to the remote computer platform 505, where the remote computer platform 505 resides on an unmanned aerial vehicle, for example. The generated output is based on the one or more differences that may be indicative of hidden data transmissions hosting a malicious payload or cybersecurity threat. In some embodiments, the CSM server 212 raises an alert. For example the CSM server 212 transmits an alert to the remote computer platform 505 based on the output, where the alert may notify a remote computer platform residing on an unmanned aerial vehicle that one or more identified differences are indicative of data transmissions hosting a malicious payload or cybersecurity threat, such that the remote computer platform can initiate corrective measures. In other embodiments, the CSM server 212 generates a work order, instructs the remote computer platform 505 to be isolated, or attempts to resynchronize with the remote computer platform 505.

In some embodiments, at least one of the inputs of the remote computer platform 505 includes environmental data associated with the remote computer platform 505. In these embodiments, the CSM server 212 receives environmental data associated with the remote computer platform 505, such as from other data sources 545. The CSM server 212 compares payload data retrieved from the one or more outbound communications with the environmental data and detects one or more differences based on the comparison. In these embodiments, the CSM server 212 confirms that the environmental data measured by the sensors in the remote computer platform 505 match the observed environmental conditions. In some embodiments, this check is performed prior to inputting the environmental conditions into the simulation model 555.

In some embodiments, the CSM server 212 receives one or more inbound communications transmitted to the remote computer platform 505, such as from the operational server 540. The CSM server 212 inputs into the simulation model 555 the one or more inbound communications transmitted to the remote computer platform 505 to generate the one or more outputs of the simulation model 555. In some further embodiments, the CSM server 212 synchronizes the simulation model 555 with the remote computer platform 505 by inputting the one or more inbound communications into the simulation model 555 based on when the one or more inbound communications would be received by the remote computer platform 505.

In some embodiments, the simulation model 555 includes sensor data from at least one simulated sensor representing at least one sensor associated with the remote computer platform 505. In these embodiments, the CSM server 212 receives environmental data associated with the remote computer platform 505. The CSM server 212 generates simulated sensor data for the at least one simulated sensor based on the environmental data. Then the CSM server 212 inputs the simulated sensor data into the simulation model 555 to generate the one or more outputs of the simulation model 555.

In some embodiments, the CSM server 212 receives one or more direct communications directly from the remote computer platform 505 and synchronizes the simulation model 505 based on the one or more direct communications.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for monitoring remote computer systems for potential cybersecurity threats without requiring additional hardware and/or software at the remote computer system. The system and methods described herein address that technical problem. Additionally, at least one of the technical solutions to the technical problems provided by this system may include: (i) improved security systems; (ii) increased monitoring of remote systems without increased hardware or software at the remote system; (iii) early warning of potential sensor issues; and (iv) detecting potential cybersecurity threats in real-time or near real-time.

The methods and systems described herein may be implemented using computer programming or engineering techniques including computer software, firmware, hardware, or any combination or subset thereof, wherein the technical effects may be achieved by performing at least one of the following steps: (a) execute a real-time simulation model of the remote computer platform, wherein the simulation model simulates inputs and outputs of the remote computer platform based on real-time data; (b) receive one or more outbound communications transmitted from the remote computer platform; (c) generate one or more outputs of the simulation model; (d) compare the one or more outbound communications transmitted from the remote computer platform to the one or more outputs of the simulation model; (e) detect one or more differences based on the comparison; and (f) generate an output based on the one or more differences.

The technical effects may also be achieved by performing at least one of the following steps: (a) execute a real-time simulation model of the remote computer platform, wherein the simulation model simulates inputs and outputs of the remote computer platform based on real-time data; (b) receive a first data stream transmitted from the remote computer platform, wherein the first data stream includes a plurality of communications based, at least in part, on measurements from one or more sensors associated with the remote computer platform, wherein the one or more sensors measure environment conditions associated with the remote computer platform; (c) receive a second data stream comprising one or more environmental conditions associated with the remote computer platform; (d) compare payload data from the first data stream with the one or more environmental conditions of the second data stream; (e) detect one or more differences based on the comparison; and (f) generate an output based on the one or more differences.

In addition, the technical effects may also be achieved by performing at least one of the following steps: (a) executing a real-time simulation model of the remote computer platform, wherein the simulation model simulates inputs and outputs of the remote computer platform based on real-time data; (b) receiving one or more outbound communications transmitted from the remote computer platform, wherein the one or more outbound communications based, at least in part, on measurements from one or more sensors associated with the remote computer platform, wherein the one or more sensors measure environment conditions associated with the remote computer platform; (c) receiving environmental data associated with the remote computer platform; (d) comparing payload data from the one or more outbound communications with the environmental data; (e) generating one or more outputs of the simulation model based, at least in part, on the environmental data; (f) comparing the one or more outbound communications transmitted from the remote computer platform to the one or more outputs of the simulation model; (g) detecting one or more differences based on the two comparisons; and (h) generating an output based on the one or more differences.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for detecting anomalies comprising a computer system including at least one processor in communication with at least one memory device, wherein the computer system receives communications from a remote computer platform that resides on a vehicle, and wherein the at least one processor is programmed to:
execute a real-time simulation model of the remote computer platform, wherein the simulation model simulates inputs and outputs of the remote computer platform based on real-time data, wherein the vehicle is remote from the computer system, and wherein the real-time simulation model of the remote computer platform is based on a current location of the vehicle;
intercept a first data stream routed and transmitted from the remote computer platform to a first computer device, wherein the first data stream includes a plurality of communications based, at least in part, on measurements from one or more sensors associated with the remote computer platform, wherein the one or more sensors measure environment conditions at the current location of the vehicle associated with the remote computer platform, and wherein the first computer device is separate from the computer system;
receive a second data stream comprising one or more environmental conditions at the current location of the vehicle associated with the remote computer platform;
compare payload data from the first data stream with the one or more environmental conditions of the second data stream;
detect one or more differences based on the comparison; and
detect at least one cybersecurity threat based on the one or more differences.

2. The system in accordance with claim 1, wherein the at least one processor is further programmed to:
subsequent to comparing the payload data, generate one or more outputs of the simulation model using the second data stream; and
compare the first data stream to the one or more outputs of the simulation model.

3. The system in accordance with claim 2, wherein the at least one processor is further programmed to detect one or more differences between the first data stream and the one or more outputs of the simulation model based on at least one of message size, data handshaking rate or frequency, and transmission delay associated with the first data stream.

4. The system in accordance with claim 2, wherein the at least one processor is further programmed to detect one or more differences between the first data stream and the one or more outputs of the simulation model based on a time series analysis.

5. The system in accordance with claim 1, wherein the at least one processor is further programmed to:
receive a third data stream transmitted to the remote computer platform; and
input into the simulation model the third data stream to generate the one or more outputs of the simulation model.

6. The system in accordance with claim 5, wherein the at least one processor is further programmed to synchronize the simulation model with the remote computer platform by inputting the data stream into the simulation model based on when the remote computer platform receives the third data stream.

7. The system in accordance with claim 1, wherein the at least one processor is further programmed to:
receive one or more direct communications directly from the remote computer platform; and
synchronize the simulation model based on the one or more direct communications.

8. The system in accordance with claim 1, wherein the at least one processor is further programmed to transmit an alert to the remote computer platform based on detecting at least one cybersecurity threat.

9. The system in accordance with claim 1, wherein the remote computer platform is aboard an aircraft.

10. The system in accordance with claim 1, wherein the second data stream comprising one or more environmental conditions at the current location of the vehicle associated with the remote computer platform includes at least one of real-time actual data or modeled data.

11. A method for detecting anomalies in a remote computer platform, the method implemented on a computer system including at least one processor in communication with at least one memory device, wherein the computer system receives communications from a remote computer platform that resides on a vehicle, the method comprising:
executing a real-time simulation model of the remote computer platform, wherein the simulation model simulates inputs and outputs of the remote computer platform based on real-time data, wherein the vehicle is remote from the computer system, and wherein the real-time simulation model of the remote computer platform is based on a current location of the vehicle;
intercepting one or more outbound communications routed and transmitted from the remote computer platform to a first computer device, wherein the one or more outbound communications based, at least in part, on measurements from one or more sensors associated with the remote computer platform, wherein the one or more sensors measure environment conditions at the current location of the vehicle associated with the remote computer platform, and wherein the first computer device is separate from the computer system;
receiving environmental data at the current location of the vehicle associated with the remote computer platform;
comparing payload data from the one or more outbound communications with the environmental data;
generating one or more outputs of the simulation model based, at least in part, on the environmental data;
comparing the one or more outbound communications transmitted from the remote computer platform to the one or more outputs of the simulation model;
detecting one or more differences based on the two comparisons; and
detecting at least one cybersecurity threat based on the one or more differences.

12. The method in accordance with claim 11 further comprising detecting one or more differences between the one or more outbound communications and the one or more outputs of the simulation model based on at least one of message size, data handshaking rate or frequency, and transmission delay associated with the one or more outbound communications.

13. The method in accordance with claim 11 further comprising detecting one or more differences between the one or more outbound communications and the one or more outputs of the simulation model based on a time series analysis.

14. The method in accordance with claim 11 further comprising:
   subsequent to comparing the payload data, generating one or more outputs of the simulation model using the second data stream; and
   comparing the first data stream to the one or more outputs of the simulation model.

15. The method in accordance with claim 11 further comprising:
   receiving one or more inbound communications transmitted to the remote computer platform; and
   input into the simulation model the one or more inbound communications to generate the one or more outputs of the simulation model.

16. The method in accordance with claim 15 further comprising synchronizing the simulation model with the remote computer platform by inputting the data stream into the simulation model based on when the remote computer platform receives the third data stream.

17. The method in accordance with claim 11 further comprising:
   receiving one or more direct communications directly from the remote computer platform; and
   synchronize the simulation model based on the one or more direct communications.

18. The method in accordance with claim 11, wherein the at least one processor is further programmed to transmit an alert to the remote computer platform based on detecting at least one cybersecurity threat.

19. The method in accordance with claim 11, wherein the remote computer platform is aboard an aircraft.

20. The method in accordance with claim 11, wherein the environment data is at least one of real-time actual data or modeled data.

* * * * *